(12) United States Patent
Haas et al.

(10) Patent No.: US 10,098,509 B2
(45) Date of Patent: Oct. 16, 2018

(54) SHOWER CURTAIN AND A METHOD TO MANUFACTURE

(71) Applicants: Jonathan Haas, Merrick, NY (US); Ryan McGann, East Setauket, NY (US); Diana D. Brehob, Dearborn, MI (US)

(72) Inventors: Jonathan Haas, Merrick, NY (US); Ryan McGann, East Setauket, NY (US); Diana D. Brehob, Dearborn, MI (US)

(*) Notice: Subject to any disclaimer, the term of this patent is extended or adjusted under 35 U.S.C. 154(b) by 0 days.

(21) Appl. No.: 15/009,638

(22) Filed: Jan. 28, 2016

(65) Prior Publication Data

US 2016/0220076 A1    Aug. 4, 2016

Related U.S. Application Data

(60) Provisional application No. 62/109,601, filed on Jan. 29, 2015.

(51) Int. Cl.
| | |
|---|---|
| *A47K 3/38* | (2006.01) |
| *B32B 3/30* | (2006.01) |
| *B29D 7/01* | (2006.01) |
| *B29C 69/00* | (2006.01) |
| *B29C 59/02* | (2006.01) |
| *B29C 49/42* | (2006.01) |
| *B29K 105/00* | (2006.01) |
| *B29L 31/00* | (2006.01) |

(Continued)

(52) U.S. Cl.
CPC ............ *A47K 3/38* (2013.01); *B29C 49/4273* (2013.01); *B29C 59/025* (2013.01); *B29C 69/001* (2013.01); *B29D 7/01* (2013.01); *B29C 49/00* (2013.01); *B29C 65/02* (2013.01); *B29C 65/06* (2013.01); *B29C 65/08* (2013.01); *B29C 65/48* (2013.01); *B29C 66/1122* (2013.01); *B29C 66/30221* (2013.01); *B29C 66/30321* (2013.01); *B29C 66/439* (2013.01); *B29C 66/4722* (2013.01); *B29K 2105/256* (2013.01); *B29L 2031/719* (2013.01)

(58) Field of Classification Search
CPC ..... A47K 3/38; B32B 3/30; Y10T 428/24174; Y10T 428/24182
USPC .................................................... 160/349.1
See application file for complete search history.

(56) References Cited

U.S. PATENT DOCUMENTS

| | | | | |
|---|---|---|---|---|
| 2,668,298 A | * | 2/1954 | Kimmons | ............... A47G 5/00 |
| | | | | 160/180 |
| 2,840,160 A | * | 6/1958 | Tichenor | ................. A47K 3/38 |
| | | | | 160/349.1 |

(Continued)

*Primary Examiner* — Janie Loeppke
(74) *Attorney, Agent, or Firm* — Brehob Law, PLLC; Diana D. Brehob (57) ABSTRACT

It is well known that plastic shower curtains can develop mildew and/or mold where the curtain adheres to another surface and remains moist, such as the edge of a bathtub. A shower curtain with at least a portion of the surface being non-smooth is disclosed. In some embodiments, appendages extend outwardly from the surface of the curtain. The appendages prevent the surface of the curtain from adhering to another surface via surface tension of water. Furthermore, the appendages create an air gap that enables air to flow freely between the curtain and its adjacent surface. The appendages also reduce the surface area of the curtain in contact with the adjacent surface.

19 Claims, 4 Drawing Sheets

(51) Int. Cl.
　　*B29C 65/08*　　(2006.01)
　　*B29C 65/48*　　(2006.01)
　　*B29C 65/00*　　(2006.01)
　　*B29C 49/00*　　(2006.01)
　　*B29C 65/02*　　(2006.01)
　　*B29C 65/06*　　(2006.01)

(56) References Cited

U.S. PATENT DOCUMENTS

| | | | |
|---|---|---|---|
| 4,122,559 A | 10/1978 | Kelly | |
| 5,495,628 A * | 3/1996 | Logan | A47K 3/38 160/330 |
| 5,732,420 A | 3/1998 | Micciche | |
| 5,771,504 A | 6/1998 | Steiner | |
| 5,826,284 A * | 10/1998 | Wren | A47K 3/38 4/609 |
| 6,049,920 A | 4/2000 | Mochizuki | |
| 6,292,957 B1 * | 9/2001 | Thompson | A47K 3/38 24/303 |
| 6,761,960 B2 | 7/2004 | De Luca | |
| 6,851,133 B1 | 2/2005 | Nehring | |
| 7,691,464 B2 | 4/2010 | Gerber | |
| 2009/0089927 A1 * | 4/2009 | Li | A47K 3/38 4/608 |
| 2009/0272502 A1 * | 11/2009 | Brown | A47K 3/38 160/330 |

* cited by examiner

SHOWER CURTAIN AND A METHOD TO MANUFACTURE

FIELD

The present invention relates to shower curtains and liners and methods of fabricating such curtains and liners.

BACKGROUND

Within the present disclosure, the terms: shower curtain, shower liner, curtain, and liner are used interchangeably to denote both shower curtains and shower liners. Water can accumulate between the curtain and an adjacent surface such as the tub or shower basin. In the presence of soap, shampoo, biological matter (such as skin cells), and air borne material such as spores, to be referred to as foreign bodies, can accumulate and become trapped between the curtain and the adjacent surface or any surface in the vicinity of the curtain. Surface tension of the water can keep the shower curtain adhered to the adjacent surface. As a result, foreign bodies, which includes but is not limited to the bacteria, mold, mildew, fungi, or any other microorganism, form in the presence of liquid, grow, and propagate.

One or more bathrooms in residences has a tub or shower. A basin for a shower has a substantially flat-bottomed vessel surrounded by one or more walls that extend in an upward direction with an installed shower head, used for bathing purposes. In an effort to reduce shower spray and flooding that can result from shower basin use, a shower rod is provided near the top side of an open side of the enclosure from which a shower curtain can be hung via shower rings or other fasteners. Or, in some alternatives, the shower curtain, or liner, has larger holes so that it can be threaded onto the shower rod without the use of fasteners. The curtain is typically aligned to hang downward and a bottom edge of the curtain runs parallel to the flat-bottomed vessel. The bottom edge of the shower curtain hangs within the enclosure associated with the shower basin so that water that hits the curtain falls into the shower basin. The shower curtain is maintained as close as practical to the outer edge of the enclosure so that a person showering has as much room to move about as possible. The curtain drapes below an upper edge of the shower basin or tub and typically contacts the inner surface of the tub (or shower basin).

Growth of foreign bodies on shower curtains is a common problem associated with the use of a shower basin. In environments of high humidity, e.g., in the absence of adequate ventilation.

Various solutions have been described in the prior art. For example, in U.S. Pat. No. 6,049920, a shower curtain spacer is attached to the rim of the bathtub or shower stall to hold a shower curtain away from the rim. The spacers intrude in the shower space allowing less room for the occupant. Additionally, as the spacers coupled to the tub or shower stall make it more cumbersome to clean the tub or shower enclosure. Furthermore, the mildew or other foreign bodies may grow upon the spacers themselves. Likewise, other prior art solutions have drawbacks.

SUMMARY

A novel curtain that reduces the growth and accumulation of foreign bodies on the curtain surface is disclosed. This reduction in foreign bodies is achieved by appendages on the surface of the curtain that increases airflow and reduces the entrapment of water between the curtain and an adjacent surface. As a result, drying occurs which makes the surface inhospitable for growing foreign bodies.

The appendages extend outwardly from the surface of the curtain with the intent that only the appendages contact the adjacent surface. The size and geometry of the appendages can vary to include any different length, angle, degree, and geometric shape to optimize effectiveness. The appendages may include any pattern or array.

The present disclosure applies to showers or tubs with an enclosure as well as to those without, e.g., a claw foot bathtub in which a shower curtain is provided to surround the tub.

To solve at least one problem in the prior art, a shower curtain for a bathing enclosure is disclosed. The bathing enclosure has a basin, a surround, and a shower rod. The curtain has a substantially rectangular, flexible sheet having an upper edge, a lower edge, a left edge, and a right edge. The upper edge is adapted to hang from the shower rod. The lower edge has a plurality of appendages that extend outwardly from the sheet.

The sheet is comprised of a material that prevents water from passing through.

The sheet is adapted to cover at least a portion of an opening associated with the bathing enclosure. The sheet drapes below an upper edge of the bathing enclosure. The appendages are provided at least on the surface of the sheet that overlaps the bathing enclosure.

Adjacent appendages are spaced sufficiently closely so that the sheet is largely prevented from contacting a surface of the bathing enclosure.

The appendages each have a base that is affixed to the sheet and a tip that is distal from the sheet; and the cross-sectional area of the base is greater than the cross-sectional area of the tip.

A portion of the appendages are adjacent the bottom edge. It has been found experimentally that it is desirable to have some of the appendage very close to the bottom edge to ensure that any sheet below the lowest appendages doesn't contact the bathing enclosure.

The left and right edges have a plurality of appendages that extend outwardly from the sheet. In some embodiments, the edges of the sheet are provided with appendages to ensure that the edges do not adhere to the bathing enclosure.

A shower curtain for a bathing enclosure having a shower rod with a plurality of openable rings on the shower rod is disclosed. The shower curtain has a flexible sheet having an upper edge, a lower edge, a first lateral edge, and a second lateral edge. The sheet has a plurality of openings proximate the upper edge, the openings adapted to engage with the openable rings so that the shower curtain hangs from the shower rod. A plurality of appendages extend substantially normal from a portion of the shower curtain proximate the lower edge.

The shower curtain is adapted to extend below an upper edge of the bathing enclosure. The portion of the shower curtain with appendages extends up from the lower edge at least as far as the shower curtain overlaps with the bathing enclosure.

The appendages have a base portion that is coupled to the sheet and a tip portion distal from the sheet. The base portion has a greater cross-sectional area than a cross-sectional area of the tip portion.

The appendages extend outwardly from at least one side of the sheet. In some embodiments, appendage extend outwardly from both sides of the sheet.

The appendages are integrally formed with the sheet, adhered to the sheet, welded to the sheet, formed into the sheet via two dies, or affixed to the sheet by melting.

The flexible sheet comprises two sheet portions; the two sheet portions are adhered over a portion of the surface area; air pockets are enclosed between the two sheet portions; at least one of the two sheet portions extends outwardly where there is an air pocket; and the air pockets are the appendages.

The flexible sheet comprises two sheet portions. A first of the sheet portions is flat. A second of the sheet portions comprises the appendages. The first and second sheets are coupled via one of: melting, securing with an adhesive, friction welding, and melting.

The first sheet extends from the top edge to the bottom edge and the second sheet extends upwardly from the bottom edge a fraction of the distance to the upper edge.

In some embodiments, the appendages are ridges that run substantially parallel to the first lateral edge of the sheet; and channels form between adjacent ridges.

Also disclosed is a method to manufacture a shower curtain, including: blowing a plastic sheet, placing at least a portion of the plastic sheet between a first die having spikes and second die having negative spikes that mate with the spikes of the first die, and pushing the first die against the second die with sufficient force to form appendages in the plastic sheet.

In some embodiments, the curtain is heating prior to placing the plastic sheet between the first and second dies.

In some situations, the top of the sheet is folded over and a plurality of holes are formed in the folded portion of the sheet to accommodate either the shower rod or shower rings.

In some embodiments, plastic is put into a hollow side of the appendages.

In some alternatives, the first and second dies are rollers.

In some embodiments, a second plastic sheet is blown with the second plastic sheet being longer than the first plastic sheet. The first sheet is affixed onto a bottom portion of the second sheet with the appendages of the first sheet extending outwardly away from the second sheet.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
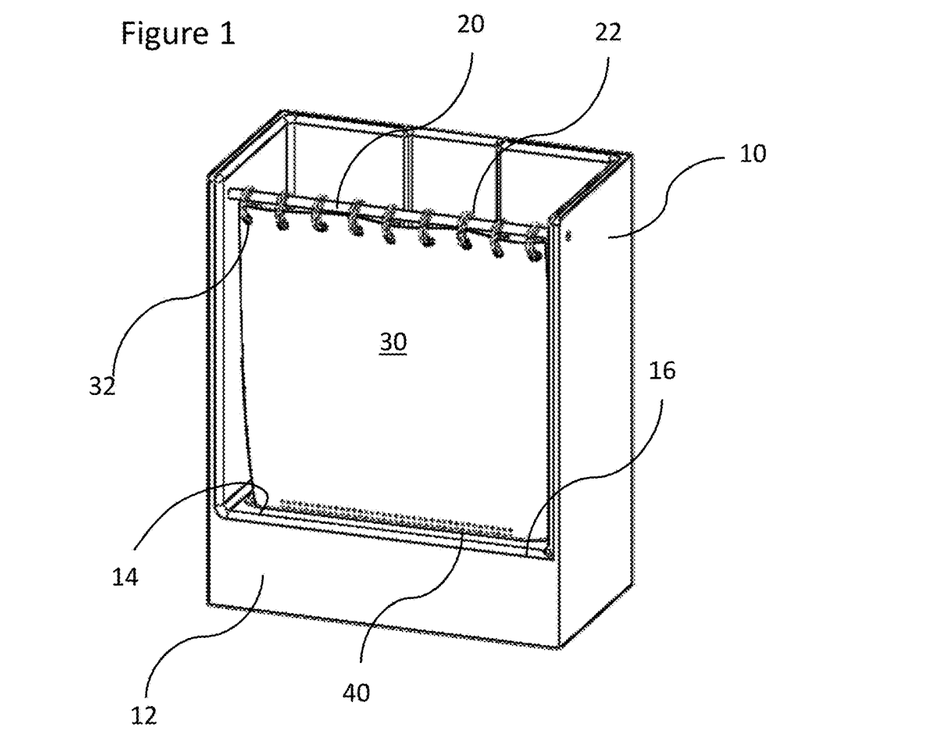
FIG. 1 is a view of a shower enclosure with a shower curtain over the opening.

A shower enclosure 10 is shown in FIG. 1. On one side of enclosure 10, a wall 12 goes up only part way from the floor. This allows ingress/egress by a person. Wall 12 has an upper edge 16. A rod 20 is provided on the open side of enclosure 10 near the top end of enclosure 10. A curtain 30 hangs from rod 20 via a plurality of rings 22 that pierce curtain 30 through holes 32 defined in curtain 30. Curtain 30 extends below the upper edge 16 of wall 12. Curtain 30 overlaps with a surface 14, which is the inside surface of wall 12. Because curtain 30 extends below upper edge 16, surface 14 is adjacent to the lower portion of curtain 30. When adjacent surface 14 is wet, it can attract curtain 30 due to the surface tension of water. However, according to an embodiment of the disclosure, curtain 30 has a plurality of appendages 40 that extend outwardly from curtain 30, which causes a sheet portion of curtain 30 to be displaced from adjacent surface 14. Tips of appendages 40 touch adjacent surface 14.

Figure 2:
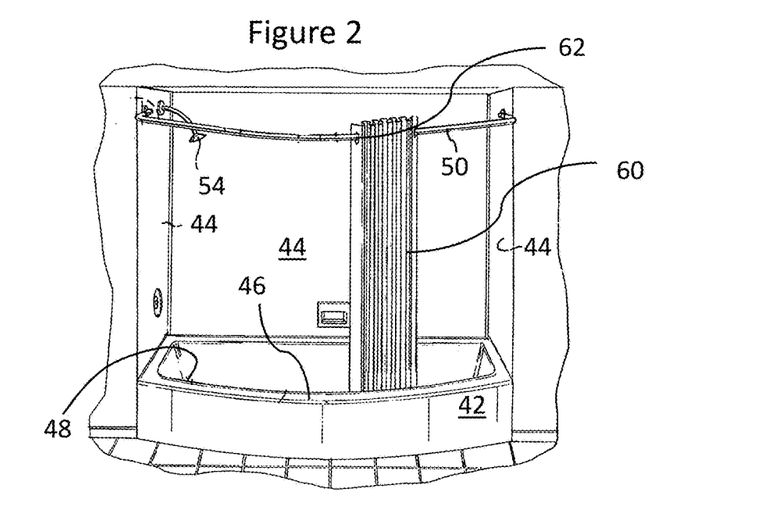
FIG. 2 is a view of bathtub and its enclosure with a shower curtain over the opening.

In FIG. 2 a tub is shown that includes walls 44 on three sides and a shower head 54 on one of walls 44. Tub 42 has an upper edge 46 and an inner surface 48. A curved shower rod 50 is provided near the top of an open side. A shower curtain 60 includes a series of openings 62 defined in an upper edge of curtain 60 that are evenly spaced. Openings 62 allows curtain 60 to be threaded onto rod 50. Curtain 60 has a plurality of appendages that extend outwardly toward inner surface 48 of tub 42. However, the appendages of curtain 60 are not visible in FIG. 2 due to the vertical folds in curtain 60.

Figure 3:
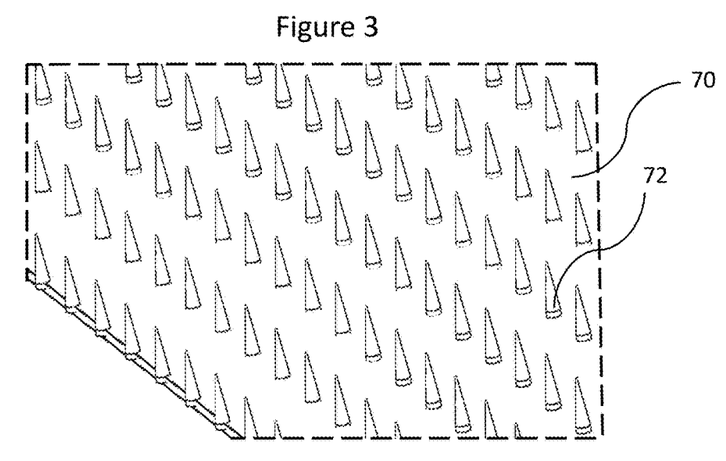
FIG. 3 shows a portion of a shower curtain showing appendages extending outwardly from the sheet portion of the shower curtain.
Figure 4:
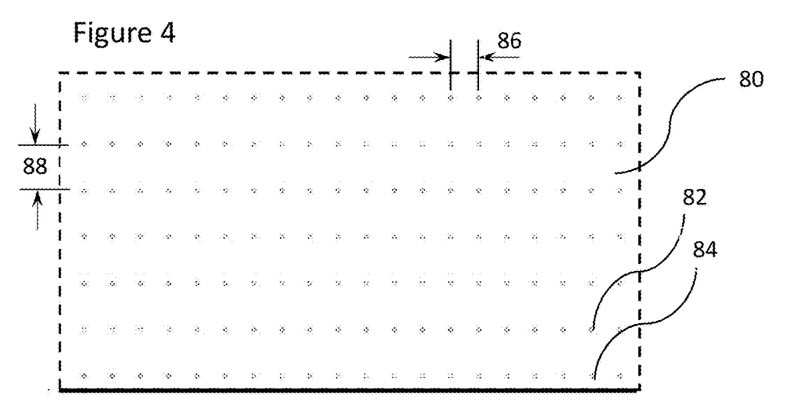
FIG. 4 shows a portion of a shower curtain showing a grid of appendages.

In FIG. 3, a sheet portion 70 of a shower curtain is shown that has a plurality of conical appendages 72 affixed thereto. Conical appendages 72 can be solid or hollow depending on the manufacturing method chosen, the type of plastic used, and other design considerations. In FIG. 4, a sheet portion 80 of a shower curtain has a plurality of appendages 82. It has been found experimentally that it is desirable to have a row of appendages very near the bottom, or at the bottom of the shower curtain. Appendages 84 are located near the bottom of sheet portion 80. Due to the action of gravity working on the shower curtain, the shower curtain doesn't fold to form a horizontal fold. Instead, it is typical for vertical folds, such as shower curtain 60 shown in FIG. 2, to form, partially due to the fact that the curtain is pushed to one side to aid in ingress and egress to the enclosure. Should the shower curtain be left in a position with folds, such as curtain 60 in FIG. 2, appendages prevent the folds from adhering to each other due to surface tension effects and to generally cause two portions of the sheet near a fold to be displaced from each other. Because the folds in a shower curtain are vertical in nature, in some embodiments, the spacing of the appendages are closer from left to right than up to down. Such an example is shown in FIG. 4 in which the distance between adjacent appendages in the left-to-right direction is shown by spacing 86 and the distance between adjacent appendages in the up-to-down direction is shown by spacing 88. Spacing 86 and spacing 88 are not very different from each other. Depending on the distance that the appendages extend from the curtain and the flexibility of the sheet material of the curtain and other factors, it may be possible to make spacing 88 much greater. In some situations, it may be desirable to provide as few appendages as suitable to provide the desired performance. It may reduce manufacturing costs, material costs, and weight of the curtain.

In some embodiments appendages 82, as shown in a grid formation in FIG. 4, are air pockets that are formed between two flat plastic sheet portions. Such technology has been developed for packing purposes in which the adjacent bubbles are about as close as possible to give the highest practical density of bubbles. In this application, however, appendages (bubbles in the embodiment) are spread apart as much as practical.

Figure 5:
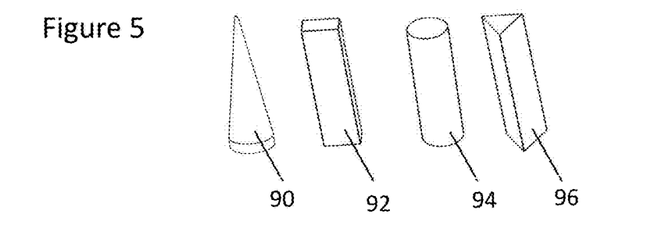
FIG. 5 shows four types of appendages.

In FIG. 5, a non-exhaustive variety of appendage configurations are shown: a conical appendage 90, a parallelepiped appendage 92, a cylindrical appendage 94, and a triangular prism 96. Any of these appendages could be solid or hollow.

Figure 6:
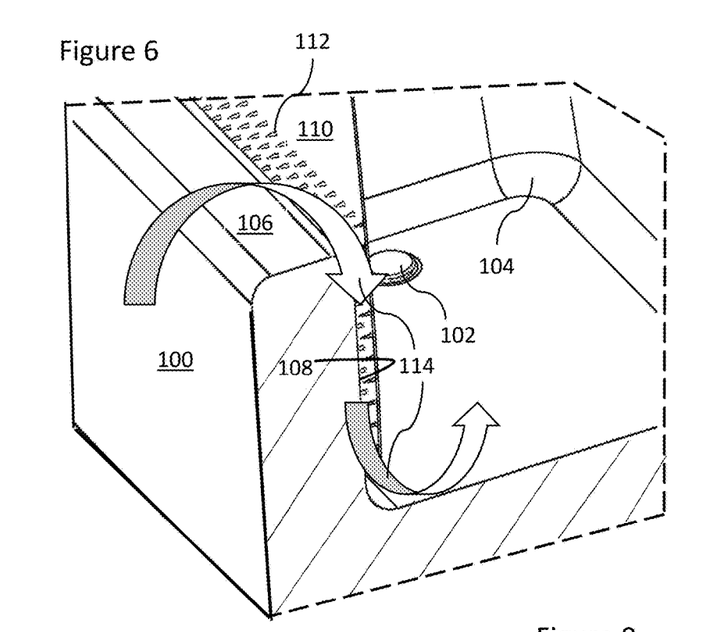
FIG. 6 shows a portion of a tub and a portion of a shower curtain with appendages showing a gap for air flow.

In FIG. 6, a section of a tub 100 that has a basin portion 104, an upper edge 106, an inner surface 108, and a drain 102. A curtain 110 has appendages 112. Curtain 110 extends below upper edge 106 of tub 100. Appendages 112 sit against inner surface 108 while preventing a sheet portion of curtain 100 (i.e., the planar surface of the curtain less the appendages) from contacting inner surface 108 and possibly adhering via surface tension of water. Air flow is promoted in the gap afforded by appendages 112, as illustrated by arrows 114. The gap provides a space for the air flow and often in a shower setting, there is a temperature difference between the air outside the shower and inside the shower which provides the driver for air flow.

Figure 7:
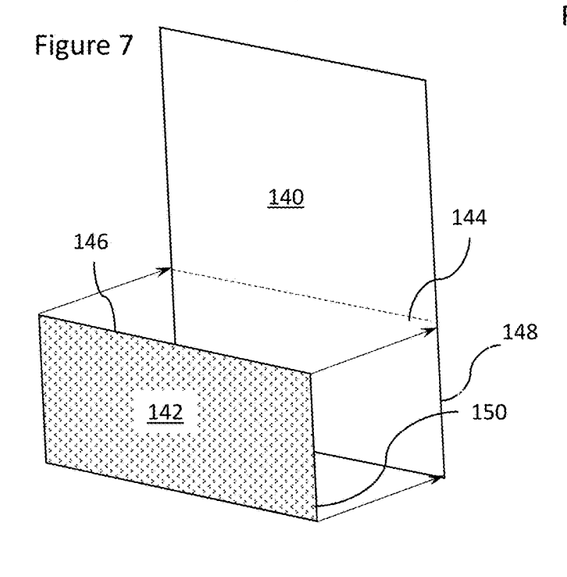
FIG. 7 shows a portion of a flat sheet to be affixed to a sheet with appendages.

In FIG. 7, a smooth sheet 140 is cut to the desired size. A rough sheet 142 that has appendages extending from one side is provided that is affixed to sheet 140. Top edge 146 of rough sheet 142 adheres to line 144 on smooth sheet 140. Right edge 148 of sheet 140 is adhered to right edge 150. Arrows show where sheet 142 is brought up to sheet 140 for adhering. In one embodiment, the edges of sheet 142 are melted to the corresponding places on sheet 140 to affix the two. In another embodiment, the sheets are brought to a melting temperature across the cross-sectional area that they are to be affixed. In yet another embodiment, an adhesive is used at the edges or across the entire cross-section area in contact.

In an alternative to FIG. 7, sheets 140 and 142 are contiguous and 142 is folded up against 140 before causing the two to be affixed.

Figure 8:
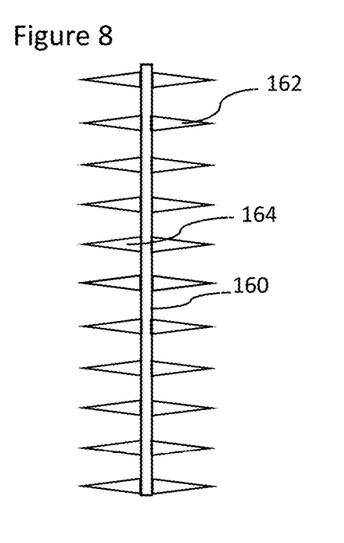
FIG. 8 shows a portion of a shower curtain with appendages affixed to both sides of the sheet portion of the curtain.

In some embodiments, appendages are provided on both sides of the shower curtain. A portion of a shower curtain is shown in FIG. 8 that has a sheet portion 160 onto which appendages 162 are provided on an inner side of sheet portion 160 and appendages 164 are provided on an outer side of sheet portion 160. The inner side appendages 162 keep the shower curtain from sticking to itself so that water can drain away and air can access the surface for drying.

There are a number of advantages presented by various embodiments of the disclosure including, but not limited to, a reduction in the need to replace the shower curtain (economic sustainability), less maintenance due to less frequent cleaning of the shower curtain which results in the use of less chemicals (environmental sustainability), a reduction in the levels of allergen and negative health repercussions resulting from the buildup of organic compounds (social sustainability), and reduction in landfill and trash buildup by increasing the length of the replacement cycle.

Figure 9:
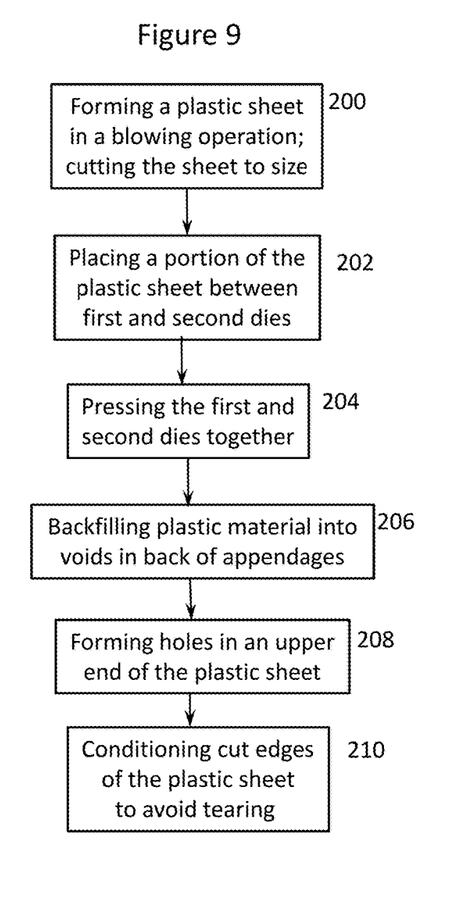
FIGS. 9 and 10 are processes by which a shower curtain with appendages is manufactured.

The curtain may be manufactured via several methods. In FIG. 9, a sheet is formed via a blown technique known in the prior art as shown in block 200 and cut to the desired size. According to embodiments of the disclosure, the sheet is placed between a pair of rollers, one of which has male spikes that engage with cavities on the other roller as shown in block 202. The sheet is heated to a temperature that allows the rollers to reform the plastic without punching holes or melting the plastic in block 204. The appendages formed by this technique are hollow. In some embodiments, the hollow appendages are backfilled with a plastic material to make the appendages more robust, in block 206. Features typically found on shower curtains are formed, in block 208; although, such features are optional and can be performed before or after other processes. One example feature is a fold near a top of the sheet so that holes can be formed in the folded portion of the sheet, i.e., a reinforced portion of that sheet. The double layers give some additional strength to the places where the holes are provided for hanging from shower rings. Additionally, it is common to form a beaded edge on the lateral edges and/or the bottom edge to lessen the chance of a tear forming from an edge. Any such features that might be normally found on shower curtains or liners may be formed in block 208. FIG. 9 is not meant to imply any particular order of operations. In block 210, the edges can be conditioned to avoid tearing. It is desirable to make the curtain or liner as thin as practical. However, a suitable thickness for the main body of the sheet may be insufficiently thick to resist tearing. So, any suitable process to improve the durability of edges of the plastic sheet may be employed in block 210.

Figure 10:
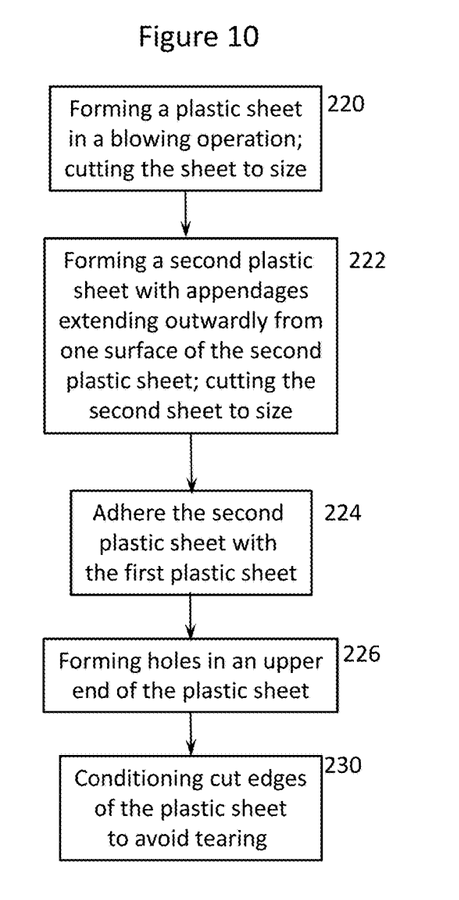

In another embodiment shown in FIG. 10, a sheet is formed in block 220 such as described in regards to FIG. 9. The sheet in block 220 is a first sheet. A second sheet is formed that has appendages extending outwardly in block 222, as shown in FIG. 10, and is cut to the desired size. In some embodiments, the second sheet extends from lateral edge to the other lateral edge and from the bottom edge to the curtain up only a portion of the way to the upper edge. The distance over which the second sheet extends from the bottom can be based on the typical dimensions of tubs, shower rods positioned above the edge of the tub, the length of a typical shower curtain, etc. The length is selected so that appendages are on the curtain over the length of the overlap of the curtain and the tub. In block 224, the first and second sheets are aligned and coupled. In one embodiment, the two sheets are affixed by ultrasonic welding. In another embodiment, the two sheets are stuck together by applying an adhesive. In yet another embodiment, the two sheets are heated to the point where they melt into each other and form a bond when cooled.

In yet another embodiment, the sheet formed in block 220 is called a first sheet. A second sheet is provided over the lower portion of the first sheet. The two sheets are adhered in a manner similar to how bubble wrap is made. The bubble portion is made by one die that has a series of small holes. A vacuum is pulled on the holes in the die to form the appendages. The two sheets are melted together around the appendages to trap air. The edges of the two sheets must also be coupled via ultrasonic welding, an adhesive, a melting process, or any suitable process. In blocks 226 and 230 any processes such as forming holes in an upper end of the plastic sheet to accommodate shower ring or conditioning cut edges to inhibit tearing are accomplished. Again, these can be performed any time and simply example processes that might be undertaken. Additional or different processes might be substituted to meet the design goals for the target product.

Herein bathing enclosure refers to a tub with its associated enclosure, a shower with its associated enclosure, or even a claw foot tub in which a curtain or curtains may be used as a surround tucked into the tub to keep shower spray from leaving the tub. Any type of enclosure for which a shower curtain may be used for keeping water inside the enclosure is anticipated by the disclosure. It is common for one to use a decorative shower curtain that is made of a plastic material to cover the opening of a bathing enclosure. It is also common for one to use a decorative, possibly porous, curtain along with a shower liner that is plastic. The terms shower curtain and liner are used interchangeably and refer to the inner curtain, typically plastic, that is used to deflect shower spray into the tub or shower and not refer to the purely decorative curtain which is supplemented by the plastic liner.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A shower curtain for a bathing enclosure, the bathing enclosure having a basin, a surround, and a shower rod, the curtain comprising:
    a substantially rectangular, flexible sheet having an upper edge, a lower edge, a left edge, and a right edge wherein:
    the upper edge is adapted to hang from the shower rod;
    the lower edge drapes below an upper edge of the bathing enclosure;
    a portion of the sheet that drapes below an upper edge of the bathing enclosure has a plurality of appendages that extend outwardly from an outer surface of the sheet;
    the sheet has a continuous inner surface in a region of the sheet opposite the outer surface having appendages;
    the appendages are arranged in an array having at least ten rows and five columns on the portion of the sheet proximate the lower edge; and
    tips of the appendages distal from the sheet are one of a point, a solid circle, and a solid polygon.

2. The shower curtain of claim 1 wherein the sheet is comprised of a material that prevents water from passing therethrough; and the appendages provide a gap between the sheet and the shower enclosure.

3. The curtain of claim 1 wherein the sheet is adapted to cover at least a portion of an opening associated with the bathing enclosure; the appendages are provided at least on the surface of the sheet that drapes below the upper edge of the bathing enclosure; and a gap between the sheet and the shower enclosure is maintained by the appendages.

4. The curtain of claim 3 wherein adjacent appendages are spaced sufficiently closely so that the sheet is largely prevented from contacting a surface of the bathing enclosure.

5. The curtain of claim 1 wherein the appendages each have a base that is affixed to the sheet and a tip that is distal from the sheet; and the cross-sectional area of the base is greater than the cross-sectional area of the tip.

6. The curtain of claim 1 wherein a portion of tips of the appendages contact a surface of the bathing enclosure; and adjacent appendages are spaced sufficiently closely so that the sheet is prevented from contacting the bathing enclosure.

7. A shower curtain for a bathing enclosure having a shower rod with a plurality of openable rings on the shower rod, comprising:
    a flexible sheet having an upper edge, a lower edge, a first lateral edge, a second lateral edge, and inner surface, and an outer surface, wherein:
    the sheet has a plurality of openings proximate the upper edge, the openings adapted to engage with the openable rings so that the shower curtain hangs from the shower rod;
    the sheet has a plurality of solid, externally-convex appendages that extend substantially normal from a portion of the outer surface of the sheet proximate the lower edge;
    below the plurality of openings proximate the upper edge of the sheet, the inner surface of the sheet is continuous; and
    the portion of the shower curtain with appendages extends up from the lower edge of the sheet at least as far as the shower curtain overlaps with the bathing enclosure wherein when the shower curtain drapes below an upper edge of the bathing enclosure, a gap between the sheet and the bathing enclosure is maintained due to adjacent appendages being spaced sufficiently closely to maintain such gap.

8. The shower curtain of claim 7 wherein the appendages are arranged in an array having at least ten columns and five rows.

9. The shower curtain of claim 7 wherein the appendages have a base portion that is coupled to the sheet and a tip portion distal from the sheet; a longest dimension of the appendages is substantially normal to the sheet; and the base portion has a greater cross-sectional area than a cross-sectional area of the tip portion.

10. The shower curtain of claim 7 wherein a fraction of the tips of the appendages contact the bathing enclosure to thereby allow air flow between the sheet and the bathing enclosure.

11. The shower curtain of claim 7, wherein the appendages are one of integrally formed with the sheet, adhered to the sheet, welded to the sheet, formed into the sheet via two dies, and affixed to the sheet by melting.

12. The shower curtain of claim 7 wherein:
    the flexible sheet comprises two sheet portions;
    a first of the sheet portions is flat;
    a second of the sheet portions comprises the appendages; and
    the first and second sheet portions are coupled via one of: melting, securing with an adhesive, friction welding, and melting.

13. The shower curtain of claim 12 wherein:
    from the top edge of the sheet to the lower edge of the sheet is a predetermined distance;
    the first portion extends from the upper edge of the sheet to the lower edge of the sheet; and the second portion extends upwardly from the lower edge of the sheet a fraction of the predetermined distance to the top edge of the sheet.

14. A shower curtain for a bathing enclosure, the curtain comprising:
 a substantially rectangular, flexible sheet having an upper edge, a lower edge, a left edge, a right edge, an inner surface and an outer surface wherein: the lower edge has a first plurality of externally convex appendages coupled to and extending outwardly from the outer surface of the flexible sheet; and a second plurality of externally convex appendages coupled to and extending outwardly from the outer surface of the flexible sheet; wherein the second plurality of appendages are situated closer to the upper edge than the first plurality of appendages; the inner surface of the flexible sheet is continuous at least in the region having the appendages; a portion of tips of the first plurality of appendages contact a surface of the bathing enclosure; and adjacent appendages are spaced sufficiently closely so that the sheet is prevented from contacting the bathing enclosure.

15. The shower curtain of claim 14 wherein the first plurality of appendages has a base portion that is coupled to the sheet and a tip portion distal from the sheet; and the base portion has a greater cross-sectional area than a cross-sectional area of the tip portion.

16. The shower curtain of claim 14 wherein the sheet is comprised of a material that prevents water from passing therethrough.

17. The shower curtain of claim 14, wherein the appendages are one of integrally formed with the sheet, adhered to the sheet, welded to the sheet, formed into the sheet via two dies, and affixed to the sheet by melting.

18. The shower curtain of claim 14, wherein a gap is maintained between the sheet and the bathing enclosure to thereby allow air flow and circulation through the gap to prevent mildew growth.

19. The shower curtain of claim 14, wherein a gap is maintained between the sheet and the bathing enclosure to thereby allow air flow and circulation through the gap to prevent fungi growth.

* * * * *